United States Patent
Cheng (10) Patent No.: US 9,339,113 B1
(45) Date of Patent: May 17, 2016

(54) VIDEO WALL MOUNT (71) Applicant: AOpen Inc., New Taipei (TW)

(72) Inventor: Sheng-Hsiung Cheng, New Taipei (TW)

(73) Assignee: AOPEN INC., New Taipei (TW)

(*) Notice: Subject to any disclaimer, the term of this patent is extended or adjusted under 35 U.S.C. 154(b) by 0 days.

(21) Appl. No.: 14/609,609

(22) Filed: Jan. 30, 2015

(30) Foreign Application Priority Data

Nov. 26, 2014 (TW) .............................. 103221005 U (51) Int. Cl.
*A47B 97/00* (2006.01)
*F16B 1/00* (2006.01)
*F16M 13/02* (2006.01)
*F16C 11/10* (2006.01)
*H04N 5/655* (2006.01)

(52) U.S. Cl.
CPC ................. *A47B 97/001* (2013.01); *F16B 1/00* (2013.01); *F16C 11/10* (2013.01); *F16M 13/022* (2013.01); *H04N 5/655* (2013.01); *F16B 2001/0035* (2013.01)

(58) Field of Classification Search
CPC . A47B 97/001; F16B 1/00; F16B 2001/0035; F16C 11/10; F16M 13/022; H04N 5/655
USPC ..................................... 211/26; 248/919–923
See application file for complete search history.

(56) References Cited

U.S. PATENT DOCUMENTS

| | | | | |
|---|---|---|---|---|
| 8,333,355 B2* | 12/2012 | Stifal | ..................... | F16M 11/10 248/276.1 |
| 8,689,479 B1* | 4/2014 | Smith | ..................... | A01K 85/02 43/37 |
| 8,730,043 B1* | 5/2014 | Guincho | ............. | G06Q 20/363 235/375 |
| 2015/0220108 A1* | 8/2015 | Lev | ........................ | G06F 1/1679 312/223.2 |
| 2015/0322996 A1* | 11/2015 | Mitchell | ................. | F16B 45/04 24/303 |

* cited by examiner

*Primary Examiner* — Korie H Chan
(74) *Attorney, Agent, or Firm* — McClure, Qualey & Rodack, LLP (57) ABSTRACT

The present creation is a video wall mount, including a first fixing rack, a second fixing rack, and a folding mechanism. The first fixing rack includes a locking piece and a magnet piece. The second fixing rack includes a rotating arm. The rotating arm having a hook and the locking piece are disposed to enable the hook to be hooked to the locking piece when the first fixing rack is located near the second fixing rack and enable the first fixing rack to be fixed at a position near the second fixing rack. When a television needs to be repaired or dismounted, a pushing force towards the second fixing rack is applied on the first fixing rack to enable the hook to rotate upward under the effect of a magnetic force from the magnet piece to leave a state of being hooked to the locking piece.

9 Claims, 10 Drawing Sheets

VIDEO WALL MOUNT

CROSS-REFERENCES TO RELATED APPLICATIONS

This non-provisional application claims priority under 35 U.S.C. §119(a) on Patent Application No. 103221005 filed in Taiwan, R.O.C. on 2014/11/26, the entire contents of which are hereby incorporated by reference.

BACKGROUND

1. Technical Field

The present creation relates to a video wall mount, and more particularly to a video wall mount that can be ejected forward.

2. Related Art

Figure 1:
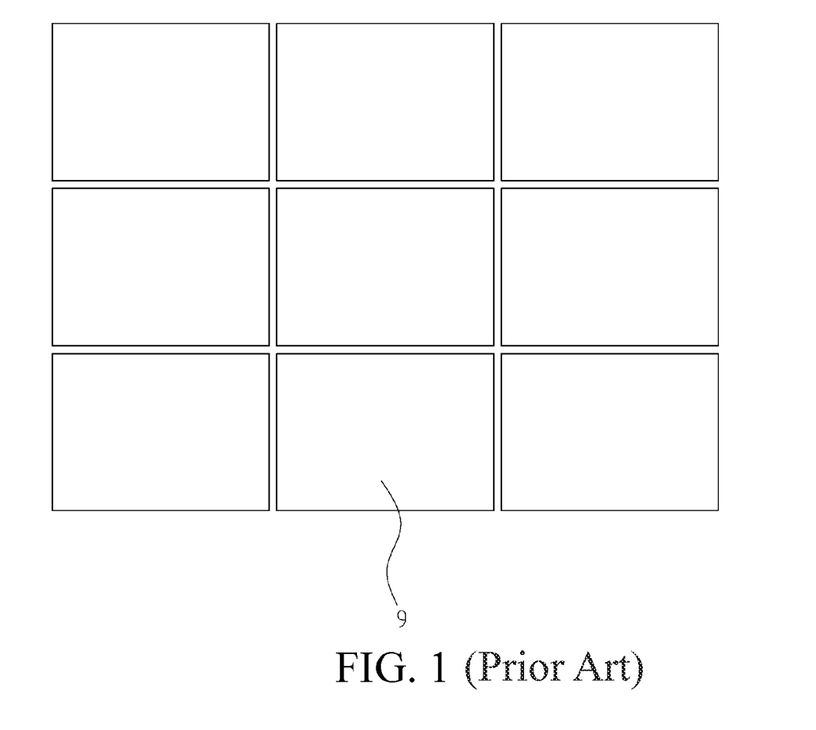
FIG. 1 is a schematic view of a video wall in the prior art.

Televisions have increasingly larger sizes and become increasingly thinner nowadays. To save mounting space and take overall appearance into consideration, televisions are often mounted onto a wall by using a wall mount. Moreover, because televisions have increasingly lower prices, many sellers also dispose a video wall to present commodities or play advertisements. As shown in FIG. 1, for a video wall assembled by using multiple televisions 9, if a floor-type video wall is disposed, a user may go behind the video wall to dismount or repair a television. However, in a case of a suspended video wall, a mounting support is directly locked on a wall, and a user cannot go behind the wall to perform repair. Meanwhile, to dismount a television located right in the middle for replacement or repair, adjacent televisions on the left and right need to be dismounted first to remove the television right in the middle. Therefore, repair or replacement becomes very inconvenient.

At present there are supports movable in a front-rear direction, and when a television needs to be repaired, a suction cup is used to hold the surface of a screen to pull out the television, so that a television support moves outward by certain repair space for repair or dismounting. However, the use of a suction cup may cause damages to liquid crystal on the surface of a television. Additionally, there is also a manner of actuating a support to move by adding a motor and a gear, so as to operate the support to move with a remote control to dismount or repair a television. However, in such a manner, one motor and a needed gear train need to be configured for every television, resulting in a very high cost.

SUMMARY

In view of this, the present creation proposes a video wall mount, including a first fixing rack, a second fixing rack, and a folding mechanism. The first fixing rack includes a locking piece and a magnet piece. The second fixing rack is disposed near a side of the first fixing rack, and the second fixing rack includes a rotating arm. The rotating arm includes a pivotal joint, a hook, and a guiding slope. The pivotal joint is pivotally connected on the second fixing rack, and the guiding slope is located between the pivotal joint and the hook. The rotating arm is rotatable about the pivotal joint being an axis to enable the hook to be selectively hooked to or unhooked from the locking piece. The folding mechanism is connected between the first fixing rack and the second fixing rack.

A connecting line of the locking piece and the pivotal joint forms a reference line, and the magnet piece is fixedly disposed on the first fixing rack and located on the reference line. When the hook of the rotating arm is selectively hooked to the locking piece, the first fixing rack is movable more easily relative to the second fixing rack, so that the locking piece abuts the guiding slope and moves relatively towards the pivotal joint, so as to further drive the rotating arm to rotate upward to a near-magnet point. The near-magnet point refers to that the rotating arm rotates upward to approach the magnet piece and is subject to a specific magnetic attraction force. The specific magnetic attraction force is sufficient to counteract a part of the gravitation of the rotating arm to extend the time for the rotating arm to rotate and fall.

By means of the foregoing structure, the video wall mount of the present creation intends to use the folding mechanism that can continuously apply a force for keeping the first fixing rack away from the second fixing rack, so as to push out a television. However, after mounting or repair is finished, the first fixing rack needs to be pushed to and fixed at a position near the second fixing rack. Therefore, the rotating arm having the hook and the locking piece are disposed to enable the first fixing rack to be fixed at a position near the second fixing rack under the effect of that the hook is hooked to the locking piece when the first fixing rack is located near the second fixing rack.

However, in a case of only using a hook to be hooked to the locking piece, to release a state of being hooked and fixed, the rotating arm needs to be operated from a side to enable the hook to leave the locking piece, so that the first fixing rack is subject to the effect of the folding mechanism again to leave the second fixing rack and push out a television disposed on the first fixing rack. However, when the video wall shown in FIG. 1 is assembled, an operation from a side becomes impossible.

Therefore, the present creation further uses the magnet piece for assistance, and calculates interaction among an attraction force from the magnet piece, a distance between the magnet piece and the rotating arm, and the gravity. That is, when the rotating arm is used and pushed upward to a certain distance, the time for the rotating arm to fall under the effect of gravitation is extended under the effect of the specific magnetic attraction force, or even the rotating arm is held by the magnet piece. When a television needs to be repaired or dismounted, only a pushing force towards the second fixing rack needs to be applied on the first fixing rack to enable the hook to rotate upward to leave a state of being hooked to the locking piece under the effect of a magnetic force from the magnet piece. In this case, under the effect of the folding mechanism, the first fixing rack can move in a direction away from the second fixing rack, instead of making the first fixing rack be fixed under the effect of the hook.

When the first fixing rack leaves the second fixing rack, because the rotating arm located at the second fixing rack loses the specific magnetic attraction force from the magnet piece located at the first fixing rack, the rotating arm falls under the effect of gravitation. In this case, after repair or mounting is finished, when the first fixing rack is moved near the second fixing rack again, the hook of the rotating arm is hooked to the locking piece again to enable the first fixing rack to be fixed at a position near the second fixing rack.

Accordingly, by means of a simple mechanical structure, a video wall mount can be folded backward and fixed or pushed forward without needing to use a suction cup or disposing a mechanism such as a motor that is high in unit price. Moreover, when metal elements such as the magnet piece and the rotating arm are used, a problem of damages after long time of use also does not easily occur, and elements have very low manufacturing costs, assembly is easy, and use is also very simple.

The foregoing first fixing rack and second fixing rack may be disposed in parallel to each other. A parallel four-bar linkage mechanism may be formed among the first fixing rack, the second fixing rack, and the folding mechanism. The magnet piece disposed at the first fixing rack may be a permanent magnet, or may also be an element or a component, for example, an electromagnet, that has magnetism or can generate the specific magnetic attraction force. The guiding slope of the foregoing rotating arm may be a linear slope, or may also be a nonlinear curved surface.

The foregoing second fixing rack may further include at least one stop piece to stop the rotating arm to avoid excessive rotation of the rotating arm. The number of at least one stop piece may be two, one of which is an upper stop piece, and the other is a lower stop piece, and the upper stop piece and the lower stop piece are disposed on an upper side and a lower side of the pivotal joint of the rotating arm, respectively.

The foregoing folding mechanism may include a reset spring for providing a preload to enable the first fixing rack to leave the second fixing rack. The rotating arm may be subject to the effect of the specific magnetic attraction force until the rotating arm is attracted by the magnet piece. The rotating arm is temporarily attracted to the magnet piece, that is, the hook of the rotating arm is enabled to temporarily leave the locking piece by a certain distance.

The detailed features and advantages of the present creation are described below in the implementation manners, and the content of the description is sufficient for any person skilled in the art to understand the technical content of the present creation and implement the present creation accordingly. According to the content disclosed in the specification, the claims, and the accompanying drawings, any person skilled in the art can readily understand the objectives and advantages related to the present creation.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 2:
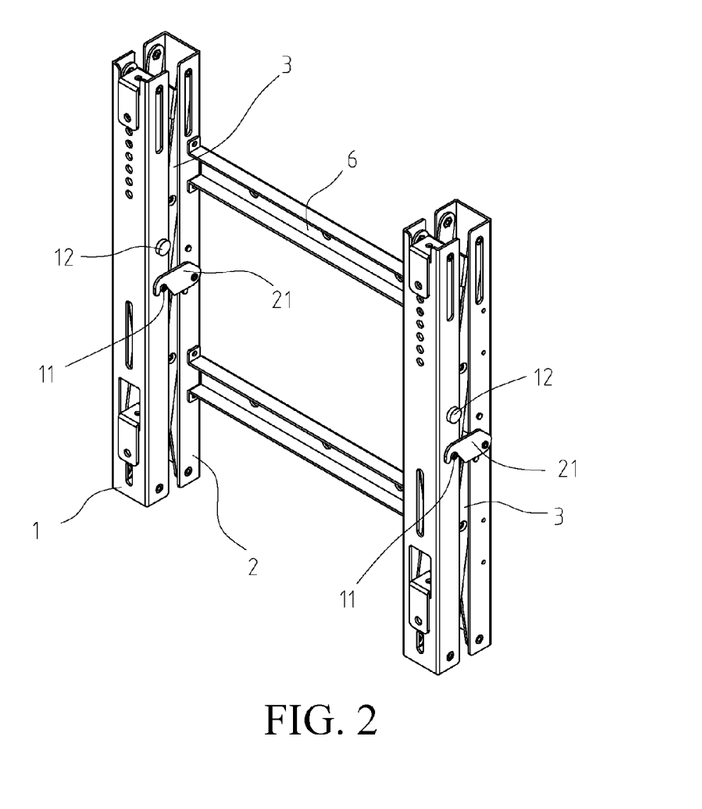
FIG. 2 is a schematic view of a video wall mount according to an embodiment of the present creation.
Figure 3:
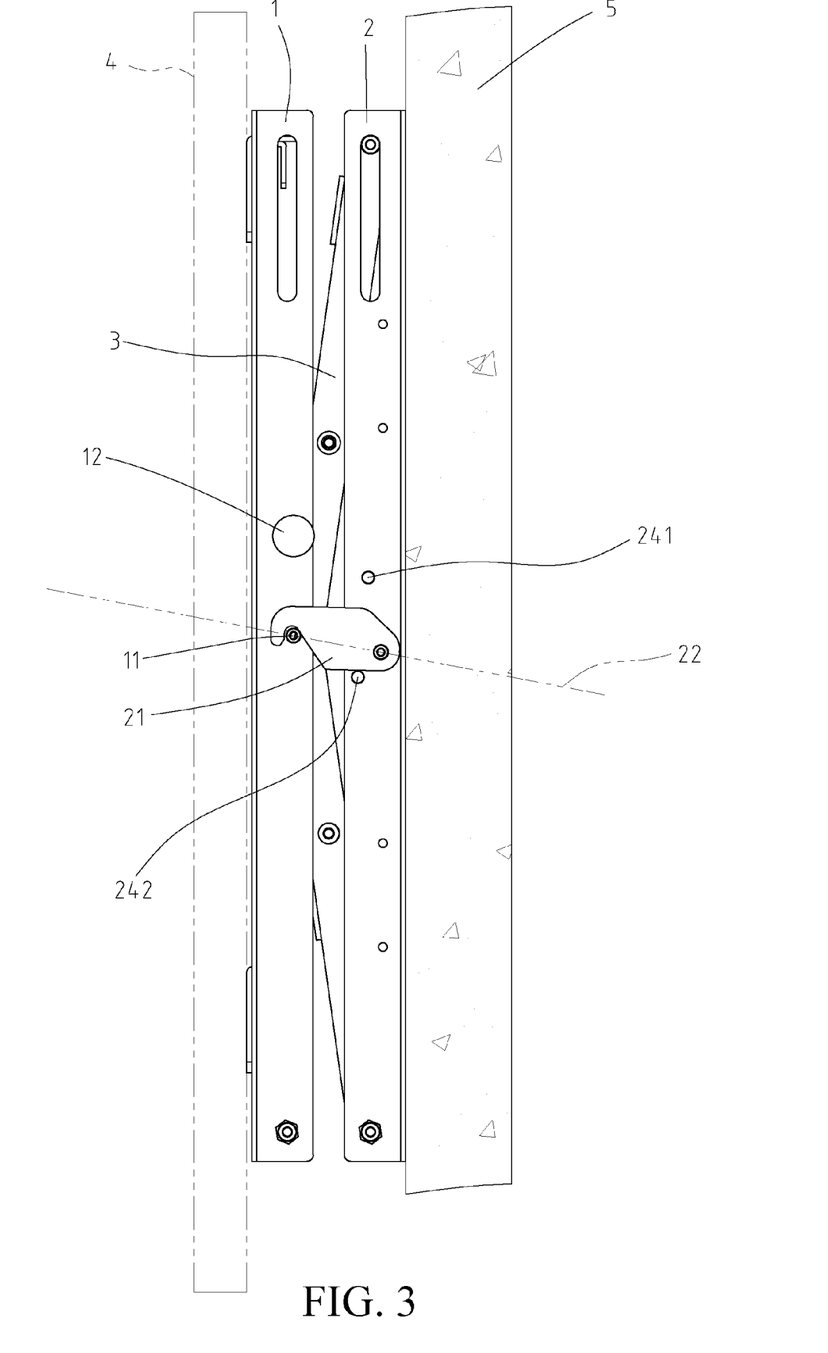
FIG. 3 is a schematic view of the video wall mount being located at a folded position according to the embodiment of the present creation.
Figure 7:
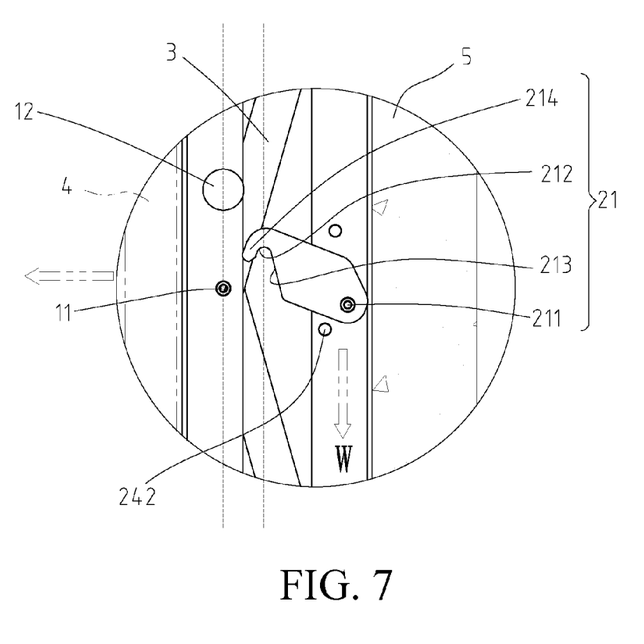
FIG. 7 is a partial enlarged view (4) showing an action of the rotating arm according to the embodiment of the present creation.
Figure 8:
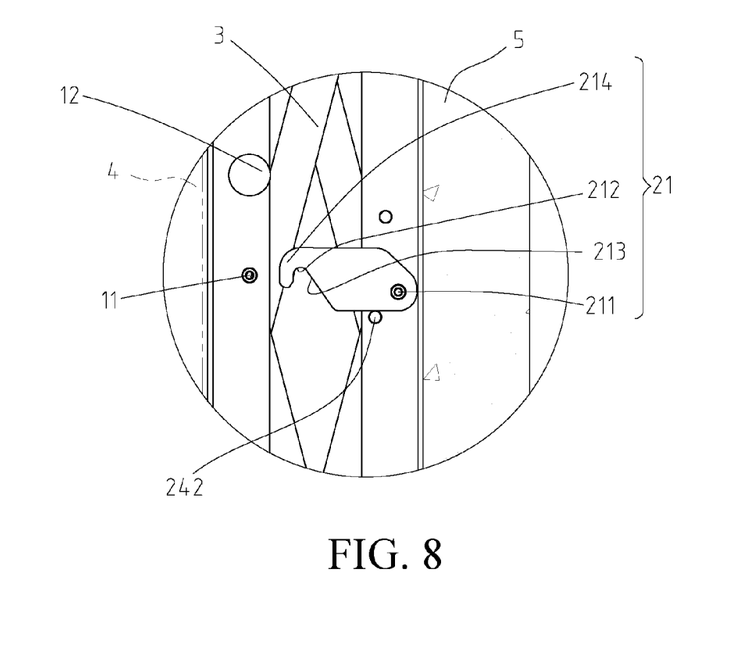
FIG. 8 is a partial enlarged view (5) showing an action of the rotating arm according to the embodiment of the present creation.
Figure 9:
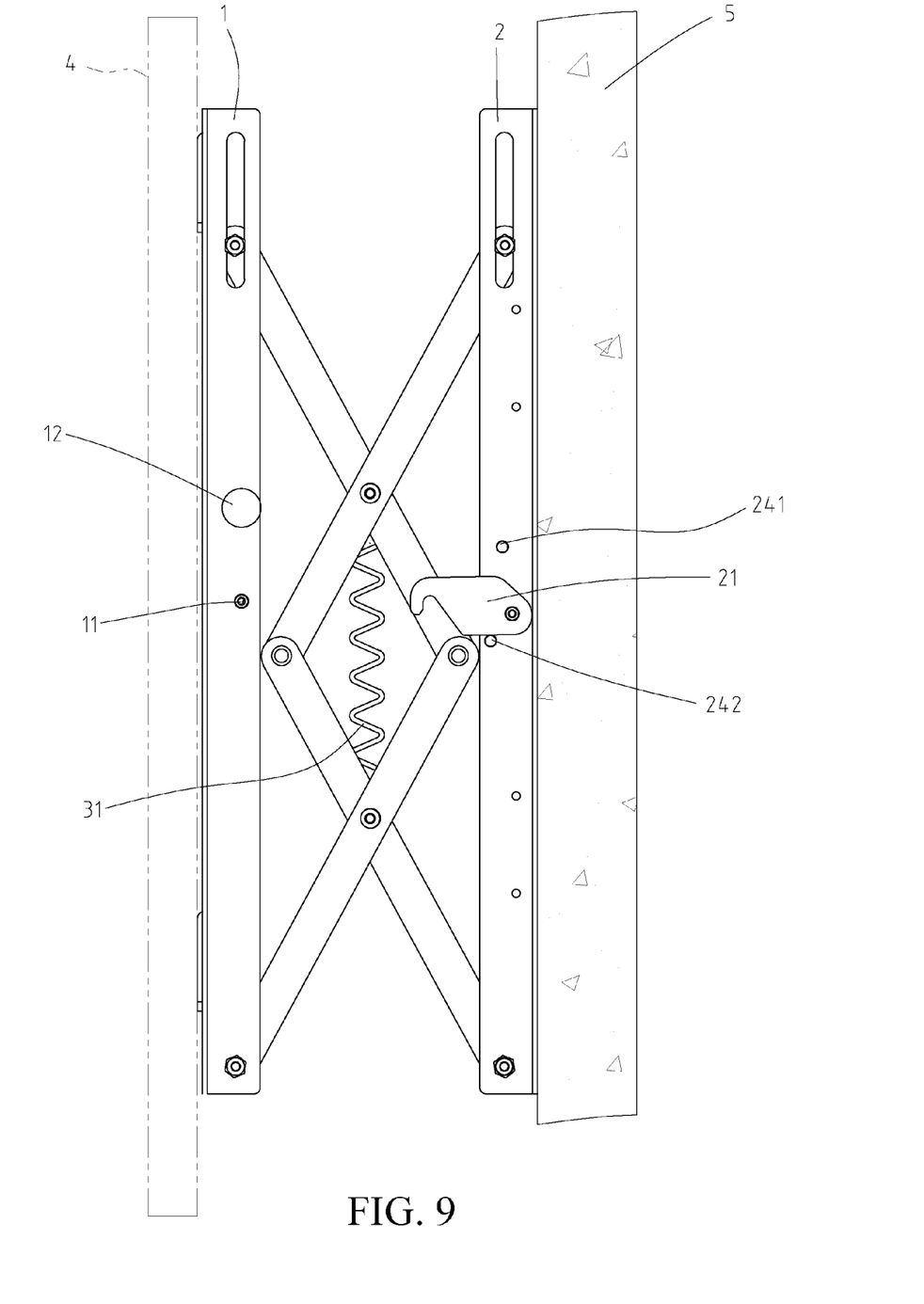
FIG. 9 is a schematic view of the video wall mount being located at an unfolded position according to the embodiment of the present creation.
Figure 10:
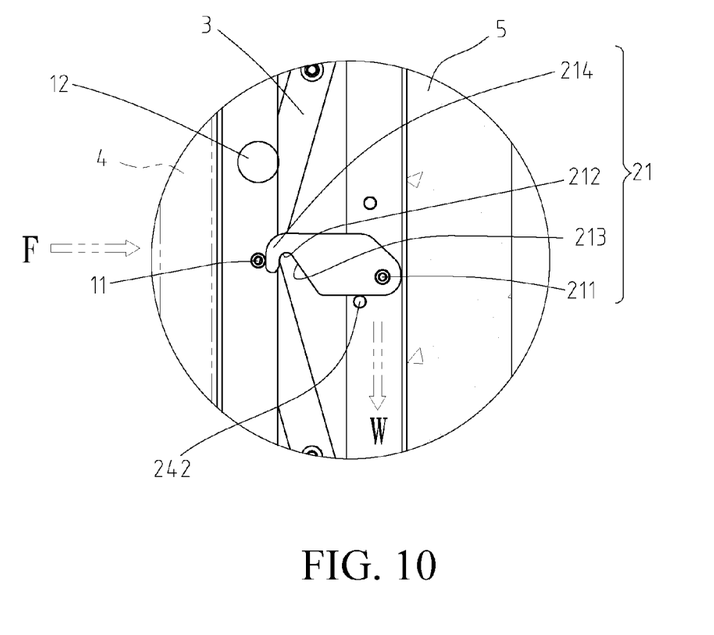
FIG. 10 is a partial enlarged view showing a folding action of the video wall mount according to the embodiment of the present creation.

Referring to FIG. 2 to FIG. 10, FIG. 2 is a schematic view of a video wall mount according to an embodiment of the present creation; FIG. 3 is a schematic view of the video wall mount being located at a folded position; FIG. 4 to FIG. 8 are partial enlarged views (1) to (5) showing actions of a rotating arm; FIG. 9 is a schematic view of the video wall mount being located at an unfolded position; and FIG. 10 is a partial enlarged view showing a folding action of the video wall mount.

As shown in FIG. 2 and FIG. 3, the video wall mount in this embodiment includes a first fixing rack 1, a second fixing rack 2, and a folding mechanism 3. The second fixing rack 2 of video wall mount is locked on a wall 5, and a television 4 is disposed to the first fixing rack 1. In this embodiment, two sets of video wall mounts are used and mounted on the rear of televisions, and the television is actuated to move in a manner of applying even forces at two sides. A connecting support 6 may further be disposed between the two sets of video wall mounts. As shown in FIG. 2, the second fixing rack 2 is disposed near a side of the first fixing rack 1, and herein the first fixing rack 1 and the second fixing rack 2 are disposed in a manner of being parallel to each other. The position relationship shown in FIG. 2 is used for description, and the first fixing rack 1 is located in front of the second fixing rack 2. Next, the relative position relationships of front and rear in the following description are all based on the position relationship shown in FIG. 2. Movement towards the rear is a pushing direction, and movement towards the front is a removing direction.

Referring to FIG. 8 together, the folding mechanism 3 is connected between the first fixing rack 1 and the second fixing rack 2, so as to provide a preload for the first fixing rack 1 to leave the second fixing rack 2. In this embodiment, the folding mechanism 3 includes a reset spring 31 to provide a preload to enable the first fixing rack 1 to leave the second fixing rack 2. As shown in FIG. 8, a parallel four-bar linkage mechanism is formed among the first fixing rack 1, the second fixing rack 2, and the folding mechanism 3. The reset spring 31 actuates a linkage mechanism to convert elastic restoring forces that are presented in vertical directions along the reset spring 31 into a preload in a direction perpendicular to the reset spring 31.

Figure 4:
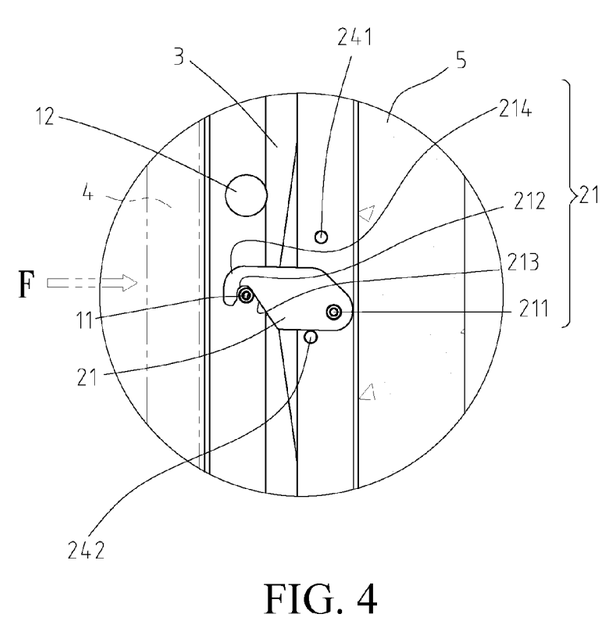
FIG. 4 is a partial enlarged view (1) showing an action of a rotating arm according to the embodiment of the present creation.

Referring to FIG. 3 and FIG. 4, the first fixing rack 1 includes a locking piece 11 and a magnet piece 12. Herein, a permanent magnet is adopted for the magnet piece 12. In other implementation aspects, the magnet piece 12 may also be an element or a structure, for example, an electromagnet, that can generate a specific magnetic attraction force. The second fixing rack 2 includes a rotating arm 21, and the rotating arm 21 includes a pivotal joint 211, a hook 212, and a guiding slope 213. The pivotal joint 211 is pivotally connected on the second fixing rack 2, the rotating arm 21 can rotate about the pivotal joint 211 being an axis to enable the hook 212 to be selectively hooked to or unhooked from the locking piece 11. The guiding slope 213 is located between the pivotal joint 211 and the hook 212, and in this embodiment, the guiding slope 213 is a linear slope. A connecting line of the locking piece 11 and the pivotal joint 211 forms a reference line 22, and the magnet piece 12 is fixedly disposed on the first fixing rack 1 and located above the reference line 22.

Figure 5:
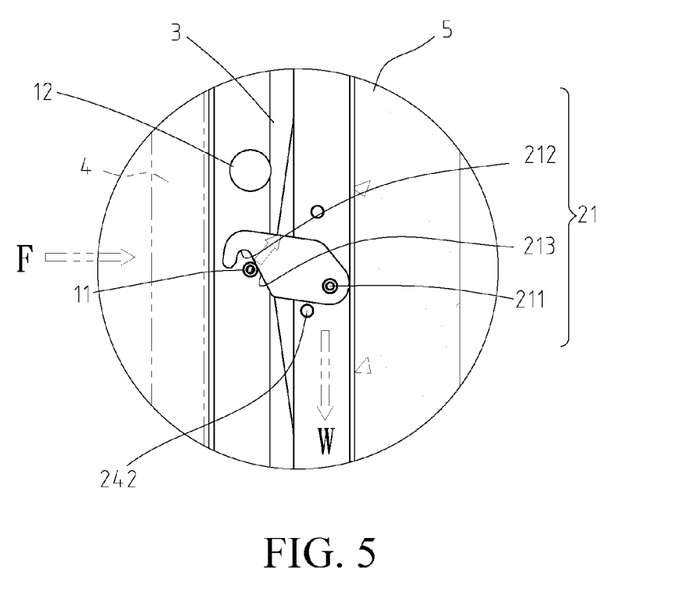
FIG. 5 is a partial enlarged view (2) showing an action of the rotating arm according to the embodiment of the present creation.

Next, FIG. 3 to FIG. 8 are used to describe the actions of the video wall mount and the rotating arm 21. When the television 4 has been assembled, the video wall mount is pushed to a folded position shown in FIG. 3, and the hook 212 of the rotating arm 21 is hooked to the locking piece 11, as shown in FIG. 4. In this case, although the folding mechanism 3 located between the first fixing rack 1 and the second fixing rack 2 still continuously provides a preload, under the effect of that the hook 212 is hooked to the locking piece 11, the first fixing rack 1 and the second fixing rack 2 may still be kept in a folded state. When the television 4 needs to be pushed to the position shown in FIG. 9 to repair or dismount the television 4, as shown in FIG. 5, a pushing force F is first applied on the first fixing rack 1. When the first fixing rack 1 is subject to the effect of the pushing force F to move towards the second fixing rack 2, the locking piece 11 located on the second fixing rack 2 abuts the guiding slope 213 of the rotating arm 21 and moves relatively towards the pivotal joint 211. Meanwhile, under the effect of abutting of the locking piece 11, the rotating arm 21 is driven to rotate upward to a near-magnet point. The so-called near-magnet point refers to that the rotating arm 21 rotates upward to approach the magnet piece 12 and is subject to a specific magnetic attraction force M. When the rotating arm 21 rotates upward to the near-magnet point, the specific magnetic attraction force M is sufficient to counteract a part of the gravitation W of the rotating arm 21 to extend the time for the rotating arm 21 to rotate and fall.

In this embodiment, to avoid an excessive thrust caused by the pushing force F and enable the rotating arm 21 to directly rotate clockwise being pushed by the locking piece 11 to exceed the range of the magnetic attraction force from the magnet piece 12, the second fixing rack 2 includes a stop piece to stop the rotating arm 21 to avoid excessive rotation of the rotating arm 21, and in this embodiment, an upper stop piece 241 located at a position above the rotating arm 21.

Figure 6:
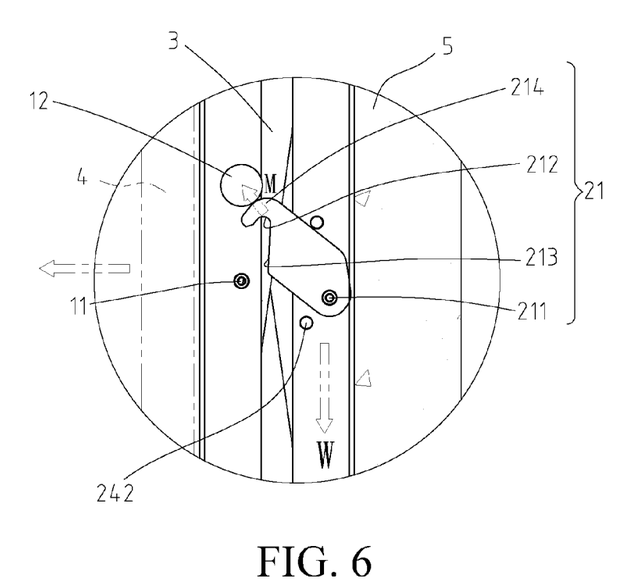
FIG. 6 is a partial enlarged view (3) showing an action of the rotating arm according to the embodiment of the present creation.

As shown in FIG. 6, the rotating arm 21 rotates to the near-magnet point, and under the effect of the specific magnetic attraction force M, an end 214 of the rotating arm 21 is directly attracted by the magnet piece 12 to enable the hook 212 of the rotating arm 21 to leave the locking piece 11. In this case, the pushing force F is then released, and because the force of the hook 212 being hooked to the locking piece 11 no longer exists, a first fixing piece 1 moves in a direction away from a second fixing rack 2 under the effect of the preload provided by the folding mechanism 3. As shown in FIG. 7, when the first fixing piece 1 moves, the magnet piece 12 located at the first fixing piece 1 is also actuated to leave the second fixing rack 2. When the distance of movement already exceeds the range of the specific magnetic attraction force M provided by the magnet piece 12, the rotating arm 21 loses the effect of the specific magnetic attraction force M, and rotates downward and falls under the effect of the gravitation W.

Because when the rotating arm 21 falls, the locking piece 11 has already left the range in which the hook 212 can be hooked, so that the fallen hook 212 of the rotating arm 21 is not hooked to the locking piece 11, as shown in FIG. 8. Therefore, the first fixing piece 1 may move till the position shown in FIG. 9 under the effect of the preload of the folding mechanism 3 to repair, assemble or dismount the television 4.

Accordingly, by means of a simple mechanical structure, a video wall mount can be folded backward and fixed without needing to use a suction cup or disposing a mechanism such as a motor that is high in unit price to push out the video wall mount. Moreover, when metal elements such as the magnet piece and the rotating arm are used, a problem of damages after long time of use also does not easily occur. Moreover, the foregoing elements have very low manufacturing costs, assembly is easy, and use is also very simple.

The paragraph beginning on page 8, line 25 is amended as follows: Subsequently, the first fixing rack 1 still needs to be moved towards the second fixing rack 2 to a folded position. Therefore, the rotating arm 21 needs to be kept at the position shown in FIG. 8, so that when the first fixing rack 1 is moved near the second fixing rack 2, the hook 212 of the rotating arm 21 is hooked to the locking piece 11 again. Therefore, the second fixing rack 2 may further include a lower stop piece 242 located at a position below the rotating arm 21. When the rotating arm 21 falls as shown in FIG. 7 and FIG. 8, the rotating arm 21 stops at the position shown in FIG. 8 being stopped by the lower stop piece 242.

Further, referring to FIG. 10, when the video wall mount needs to be moved from an unfolded position (as shown in FIG. 9) to a folded position (as shown in FIG. 3), a pushing force F is applied on the first fixing rack 1 again to enable the first fixing rack 1 to move towards the second fixing rack 2. In this case, the locking piece 11 pushes the rotating arm 21 to rotate upward till the hook 212 of the rotating arm 21 is hooked to the locking piece 11 again.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A video wall mount, comprising:
   a first fixing rack, comprising a locking piece and a magnet piece;
   a second fixing rack, disposed near a side of the first fixing rack, the second fixing rack comprising a rotating arm, the rotating arm comprising a pivotal joint, a hook, and a guiding slope, the pivotal joint being pivotally connected on the second fixing rack, the guiding slope being located between the pivotal joint and the hook, the rotating arm being rotatable about the pivotal joint being an axis to enable the hook to be selectively hooked to or unhooked from the locking piece; and
   a folding mechanism, connected between the first fixing rack and the second fixing rack;
   wherein:
   a linear segment defined between the locking piece and the pivotal joint forms a reference line, and the magnet piece is fixedly disposed on the first fixing rack and located above the reference line;
   wherein when the hook of the rotating arm is selectively hooked to the locking piece, the first fixing rack is movable more easily relative to the second fixing rack, so that the locking piece abuts the guiding slope and moves relatively towards the pivotal joint, so as to further drive the rotating arm to rotate upward to a near-magnet point, the near-magnet point refers to that the rotating arm rotates upward to approach the magnet piece and is subject to a specific magnetic attraction force, and the specific magnetic attraction force is sufficient to counteract a part of the gravitation of the rotating arm to extend the time for the rotating arm to rotate and fall.

2. The video wall mount according to claim 1, wherein the first fixing rack and the second fixing rack are parallel to each other.

3. The video wall mount according to claim 2, wherein the folding mechanism is formed by a four-bar linkage mechanism.

4. The video wall mount according to claim 1, wherein the magnet piece of the first fixing rack is a permanent magnet.

5. The video wall mount according to claim 1, wherein the guiding slope of the rotating arm is a linear slope.

6. The video wall mount according to claim 1, wherein the second fixing rack further comprises at least one stop piece to stop the rotating arm to avoid excessive rotation of the rotating arm.

7. The video wall mount according to claim 6, wherein the number of the at least one stop piece is two, one of which is an upper stop piece, and the other is a lower stop piece.

8. The video wall mount according to claim 1, wherein the folding mechanism comprises a reset spring for providing a preload to enable the first fixing rack moving away from the second fixing rack.

9. The video wall mount according to claim 1, wherein the rotating arm is directed by the specific magnetic attraction force till the rotating arm is touched by the magnet piece.

* * * * *